United States Patent [19]

Filo

[11] Patent Number: 5,604,517
[45] Date of Patent: Feb. 18, 1997

[54] ELECTRONIC DRAWING DEVICE

[75] Inventor: Andrew S. Filo, Cupertino, Calif.

[73] Assignee: Binney & Smith Inc., Easton, Pa.

[21] Appl. No.: 182,275

[22] Filed: Jan. 14, 1994

[51] Int. Cl.[6] ............................................ G09G 5/00
[52] U.S. Cl. ........................ 345/173; 434/163; 434/165
[58] Field of Search ............................. 434/156, 162, 434/163, 164, 165, 308, 309, 317, 318; 345/179, 180, 181, 182, 183, 173; 84/600, 643, 696; 446/397

[56] References Cited

U.S. PATENT DOCUMENTS

| | | | |
|---|---|---|---|
| 3,382,588 | 5/1968 | Serrell et al. | 35/9 |
| 3,757,322 | 9/1973 | Barkan et al. | 340/365 C |
| 4,044,642 | 8/1977 | Pearlman et al. | 84/1.1 |
| 4,287,568 | 9/1981 | Lester | 364/900 |
| 4,288,537 | 9/1981 | Knetzger | 434/169 |
| 4,425,099 | 1/1984 | Naden | 434/335 |
| 4,451,985 | 6/1984 | Pullman | 33/18 R |
| 4,464,118 | 8/1984 | Scott et al. | 434/85 |
| 4,470,334 | 9/1984 | Barlow et al. | 84/1.28 |
| 4,525,148 | 6/1985 | Narayanan | 434/340 |
| 4,526,078 | 7/1985 | Chadabe | 84/1.03 |
| 4,557,694 | 12/1985 | Nelson | 434/339 |
| 4,593,904 | 6/1986 | Graves | 273/1 E |
| 4,604,065 | 8/1986 | Frazer et al. | 434/331 |
| 4,614,144 | 9/1986 | Sagara et al. | 84/1.28 |
| 4,631,525 | 12/1986 | Serravalle, Jr. | 340/365 |
| 4,639,720 | 1/1987 | Rympalski et al. | 340/712 |
| 4,651,611 | 3/1987 | Deforeit | 84/1.1 |

(List continued on next page.)

FOREIGN PATENT DOCUMENTS

| | | |
|---|---|---|
| 0414566A3 | 2/1991 | European Pat. Off. . |
| 0414565A2 | 2/1991 | European Pat. Off. . |
| 0455147 | 11/1991 | European Pat. Off. . |
| 61-211098 | 9/1986 | Japan . |
| 3-55295 | 5/1991 | Japan . |
| 4-14084 | 1/1992 | Japan . |
| 4-19567 | 3/1992 | Japan . |
| 6-89138 | 3/1994 | Japan . |

OTHER PUBLICATIONS

"Do Re Mi" or Pinocchio device by Agatsuma K. K. including photocopies of box and 8 photographs of the exterior and interior of device. Also photocopies of the front and back of the box along with English language translations are provided. Product is know to have been publicly available in Japan at least as early as Dec. 1993.

Photocopy of User's manual and six photographs of the exterior and interior of the device and the box marketed under the name of "Video Painter"™ and manufactured by V–Tech™ and having a copyright notice on the box dated 1991.

(List continued on next page.)

*Primary Examiner*—Mark R. Powell
*Assistant Examiner*—Matthew Luu
*Attorney, Agent, or Firm*—Leydig, Voit & Mayer, Ltd.

[57] ABSTRACT

A drawing device for providing entertainment as well as promoting the development of children, including a plurality of drawing instruments, such as crayons, a drawing instrument detector for determining the color of the particular crayon selected for use, a pressure sensitive drawing tablet that is responsive to pressure contact from the drawing instrument, and a computer that is adapted drive an audible device, such as a speaker, to generate various audible output, including both speech and melody which, in a preferred embodiment, may vary depending upon movement from the drawing instrument. Various uniquely identified drawing sheets, which may be preprinted with a wide variety of scenes, are included to directly insert into the device and overlay the drawing tablet. In connection with these drawing sheets, the computer may be adapted to further vary the audible output of the speaker dependent upon the identity of the particular drawing sheet that is inserted.

76 Claims, 8 Drawing Sheets

U.S. PATENT DOCUMENTS

| | | | |
|---|---|---|---|
| 4,664,634 | 5/1987 | Cutler et al. | 434/311 |
| 4,669,984 | 6/1987 | Jones et al. | 434/85 |
| 4,673,357 | 6/1987 | Ito | 434/311 |
| 4,681,548 | 7/1987 | Lemelson | 434/311 |
| 4,686,332 | 8/1987 | Greanias et al. | 345/173 |
| 4,690,025 | 9/1987 | Hines et al. | 84/1.18 |
| 4,703,573 | 11/1987 | Montgomery et al. | 40/455 |
| 4,729,564 | 3/1988 | Kuna et al. | 273/1 E |
| 4,740,161 | 4/1988 | Schwartz et al. | 434/162 |
| 4,931,019 | 6/1990 | Park | 434/409 |
| 4,968,255 | 11/1990 | Lee et al. | 434/159 |
| 4,979,423 | 12/1990 | Watanabe | 84/690 |
| 4,980,919 | 12/1990 | Tsai | 381/51 |
| 4,990,092 | 2/1991 | Cummings | 434/317 |
| 4,998,457 | 3/1991 | Suzuki et al. | 84/600 |
| 5,055,053 | 10/1991 | Hyman | 434/343 |
| 5,070,755 | 12/1991 | Carroll | 84/600 |
| 5,087,043 | 2/1992 | Billings et al. | 273/157 R |
| 5,095,798 | 3/1992 | Okada et al. | 84/609 |
| 5,122,787 | 6/1992 | Fujita et al. | 340/712 |
| 5,131,311 | 7/1992 | Murakami et al. | 84/609 |
| 5,159,140 | 10/1992 | Kimpara et al. | 84/600 |
| 5,178,067 | 1/1993 | Collier | 101/405 |
| 5,188,533 | 2/1993 | Wood | 434/169 |
| 5,208,413 | 5/1993 | Tsumura et al. | 84/615 |
| 5,209,665 | 5/1993 | Billings et al. | 434/169 |
| 5,217,378 | 6/1993 | Donovan | 434/116 |
| 5,243,123 | 9/1993 | Chaya | 84/609 |
| 5,247,129 | 9/1993 | Nozaki et al. | 84/615 |
| 5,261,038 | 11/1993 | Adroher et al. | 395/103 |
| 5,274,191 | 12/1993 | Usa | 84/600 |
| 5,330,380 | 7/1994 | McDarren et al. | 466/397 |

OTHER PUBLICATIONS

Photocopies of box indicating a copyright date of 1989 by Texas Instruments, Inc., an instruction manual indicating copyright dates of 1984, 1986 and 1989 by Texas Istruments, and ten photographs of the exterior and interior of the device and the box marketed under the name of "Touch and Tell" by Texas Instrruments.

Photocopy of operating instructions and six photographs of the exterior and interior of the device and the box marketed under the name of "Electronic Sketch Pad" by Sony Corporation. No copyright dates were noted either on the box, the device, or the instruction manual, but the device is known by applicant to have been marketed at least as early as Dec., 1993.

Photocopy and four photographs of device marketed under the name of "Mukku," and having a copyright date noted on the device of 1993 by Bandai.

Photocopies of the front and back (including instructions) and four photographs of the exterior and interior of the device marketed under the name of "Golden Seek 'n' Sound"™. A copyright date of 1993 by Western Publishing Company is noted on the device.

Photocopy of the box and seven photographs of the exterior and interior of the device and box marketed under the name of "Talking Colorforms" by Sesame Street. A copyright date of 1993 by Children's Television Workshop is noted on the outside of the box.

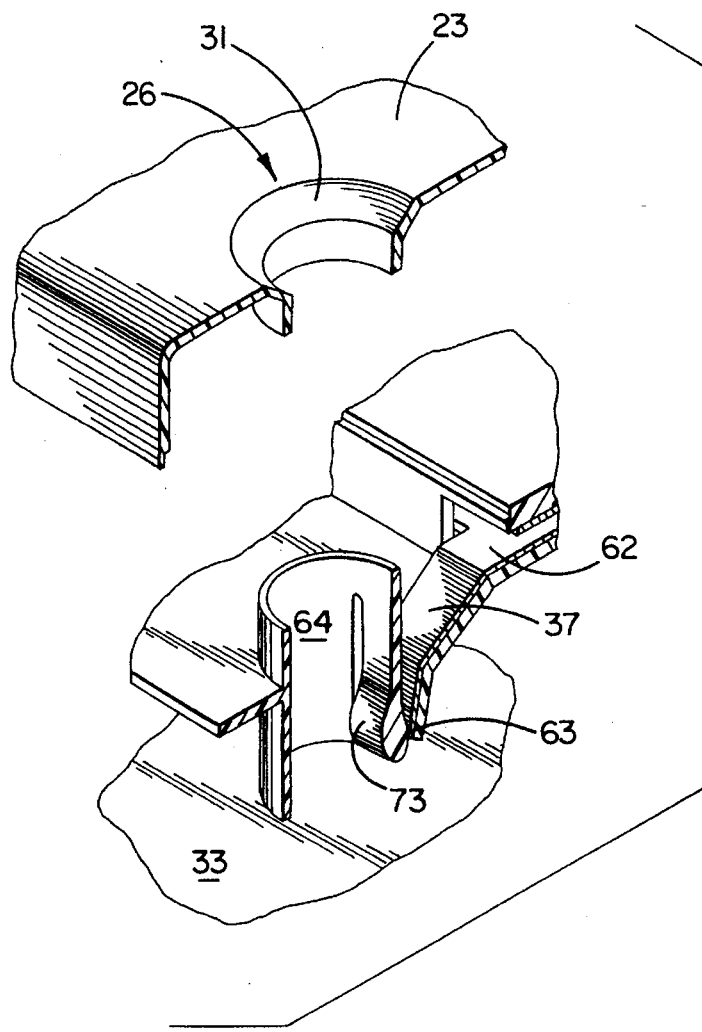
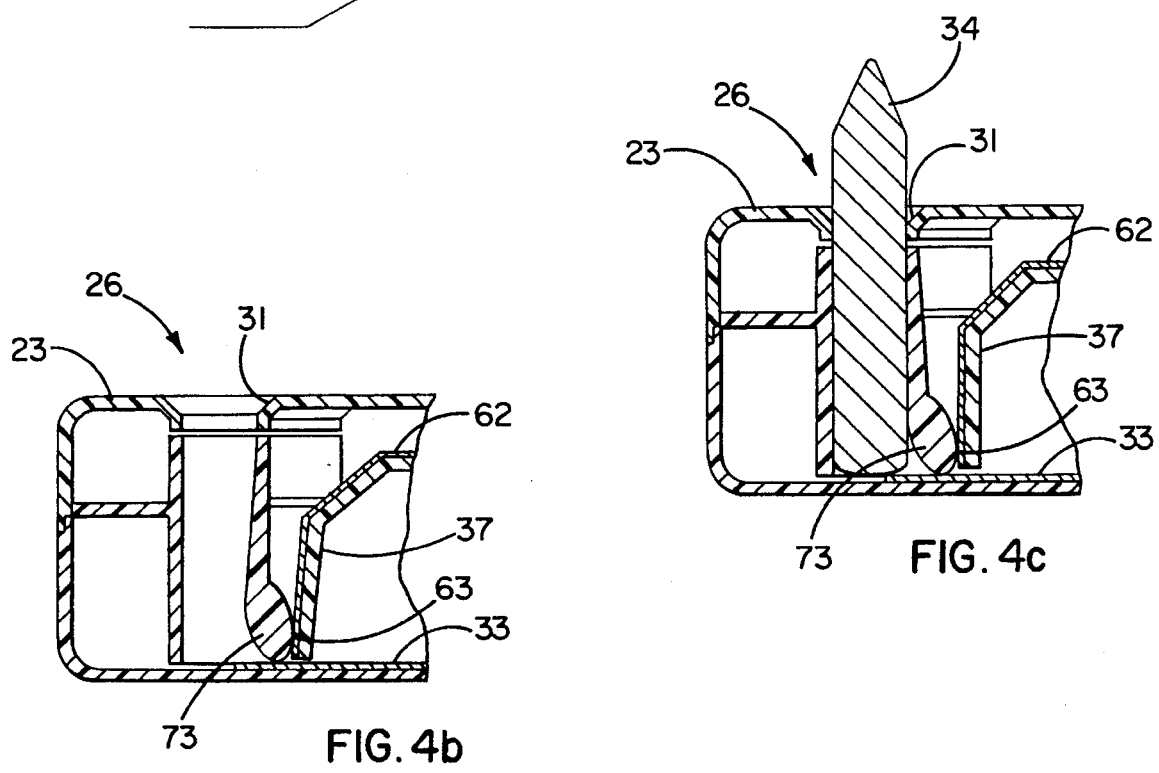
FIG. 4a
FIG. 4b
FIG. 4c

ELECTRONIC DRAWING DEVICE

FIELD OF THE INVENTION

The present invention relates to drawing devices for children, and more particularly, to interactive drawing devices directed for entertainment and development of children.

BACKGROUND OF THE INVENTION

Various entertainment and developmental devices for children have long been known. For a great number of years, for example, drawing and coloring books have provided countless hours of entertainment for children. It is further recognized by professionals among the various fields studying early childhood education and development, that drawing and coloring provide excellent vehicles for early childhood development.

To more specifically describe the developmental process, at birth, infants are unable to distinguish colors, recognizing only black and white. As they grow, vision develops to distinguish primary colors. That is, children will distinguish red from blue, long before recognizing subtle distinctions such as red from crimson or scarlet. As childrens' sense of vision matures to differentiate between various colors, they have an ever increasing desire for self-expression through coloring. Indeed, young children will tend to select specific colors depending upon the particular mood that they are experiencing at the time. As children further mature, drawing and coloring activities help to develop or enhance fine motor skills, as demonstrated by refining particular shapes through repeated drawings on blank pages, or by learning to color within the borders of preprinted patterns.

It can be appreciated that the more time children spend drawing or coloring, the faster their fine motor skills will develop. While there exists an innate desire among children to engage in drawing and coloring activities, their stamina to sustain any such single activity is generally short term. Encouraging children to repeatedly engage in drawing or coloring activities facilitates the development of their fine motor skills, as well as color identification and recognition ability.

One way of effectively encouraging children to engage in or maintain certain activities is by praising their efforts or otherwise providing positive reinforcement. While adult support and encouragement of childhood developmental activities provides a strong motivation for children to continue or repeat such activities, a more desirable means of encouragement would be a means where constant adult supervision is not required, thereby enabling children to enjoy the sense of satisfaction in coloring or creating a drawing independent of adult direction.

Since the visual stimulation that is innately achieved from drawing or coloring provides effective motivation for children to temporarily engage in these activities, it is recognized that stimulating other sensory perceptions in response to such drawing or coloring activities further encourages children to continue and repeat these activities.

More particularly, it is known that young children naturally respond to various audible stimuli in much the same fashion as visual stimuli. For example, infants make various and repeated "clucking" or other noises with their mouths because of the congenital fascination in discovering the power or ability to create such sounds. As children grow this intrinsic fascination is displayed in other ways, such as drumming on various objects with various utensils to create a wide variety of sounds.

It is, therefore, realized that if this intrinsic auditory fascination can be effectively utilized in connection with a drawing and coloring device, children will be more thoroughly entertained. As a result, children will spend more time coloring or drawing with such a device, not only providing effective entertainment, but also facilitating development of fine motor skills, as well as the ability to identify and recognize various colors.

SUMMARY OF THE INVENTION

Accordingly, it is a primary object of the present invention to provide a drawing device that provides audible stimulation to encourage children to draw or color.

Another object of the present invention is to provide a drawing device that provides audible stimulation to encourage children to recognize and identify different colors.

Yet another object of the present invention is to provide a drawing device producing audible stimulation to encourage children to draw or color, that can be manufactured at a low cost.

Still another object of the present invention is to provide a drawing device producing audible stimulation to encourage children to draw or color, that is readily adaptable to operate in multiple modes so as to provide even further stimulation for entertainment and development.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to an interactive drawing device providing audible stimuli for providing entertainment, as well as encouraging drawing and coloring development. The drawing device includes at least one drawing instrument, such as a crayon, a marker, a colored pencil, or the like. It further includes a drawing instrument detector that generates an output signal which indicates the identity of the drawing instrument selected for use. More particularly, the drawing instrument detector output signal indicates the color of the particular crayon, or other drawing instrument selected.

A pressure sensitive drawing tablet is provided, and is responsive to pressure contact from the drawing instrument to generate an output signal that is indicative of such pressure contact. Receiving the output signals from the drawing instrument detector and the drawing tablet, is a computer that is, itself, adapted to generate an output signal responsive to the combination of the received output signals. Specifically, the computer output signal is adapted to connect directly to an audible device, such as a speaker, whereby the computer output signal drives the speaker to generate various audible output.

In a preferred embodiment of the present invention, various uniquely identified drawing sheets, which may be preprinted with a wide variety of scenes, are included with the drawing device. The drawing sheets are adapted to directly insert into the device and overlay the drawing tablet. In this embodiment, the computer may be adapted to further vary the audible output of the speaker dependent upon the identity of the particular drawing sheet that is inserted into the drawing device. Furthermore, the audible output may include both speech and melody.

BRIEF DESCRIPTION OF THE DRAWINGS

The accompanying drawings incorporated in and forming a part of the specification, illustrate several aspects of the present invention, and together with the description serve to explain the principals of the invention. In the drawings:

FIG. 4a is a cut-away, exploded perspective view of an individual crayon holder/detector location;

FIG. 4b is a cut-away side view of an individual crayon holder/detector;

FIG. 4c is a cut-away side view of an individual crayon holder/detector, showing a crayon inserted therein;

Reference will now be made in detail to various present preferred embodiments of the invention, examples of which are illustrated in the accompanying drawings.

DETAILED DESCRIPTION OF THE PREFERRED EMBODIMENTS

Figure 1:
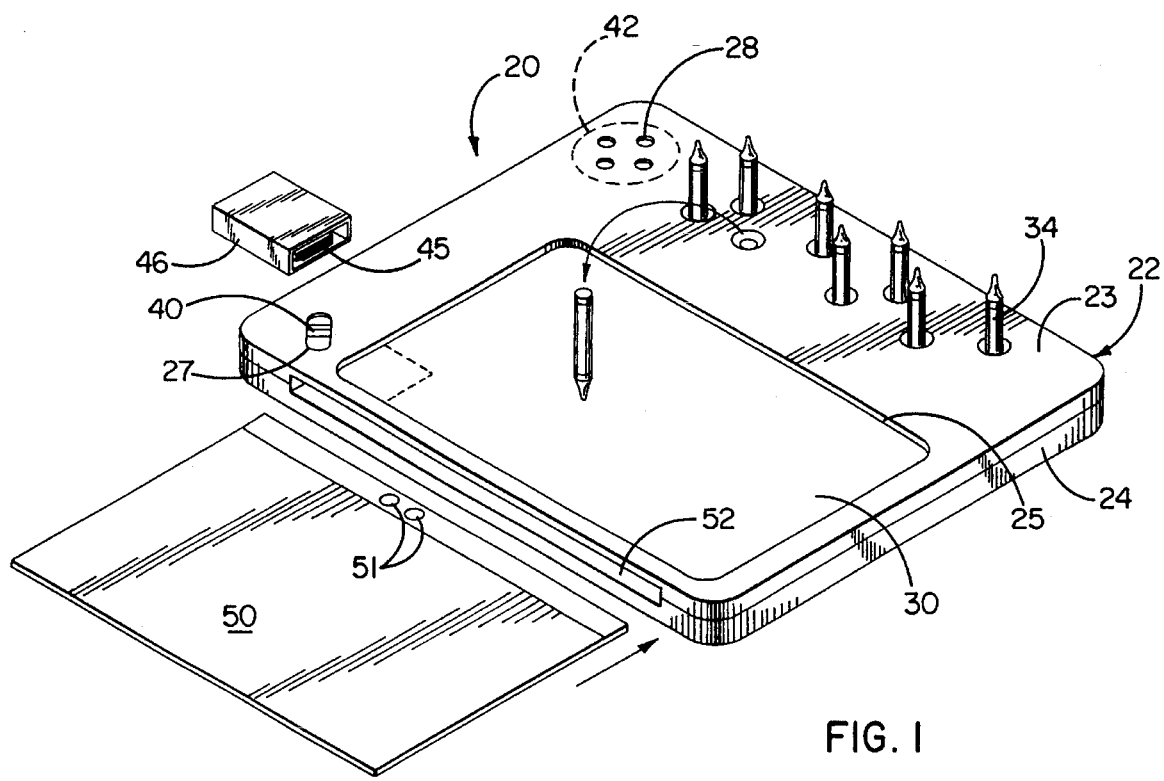
FIG. 1 is a perspective view of an electronic drawing device having a drawing sheet and auxiliary cartridge shown as exploded therefrom.
Figure 2:
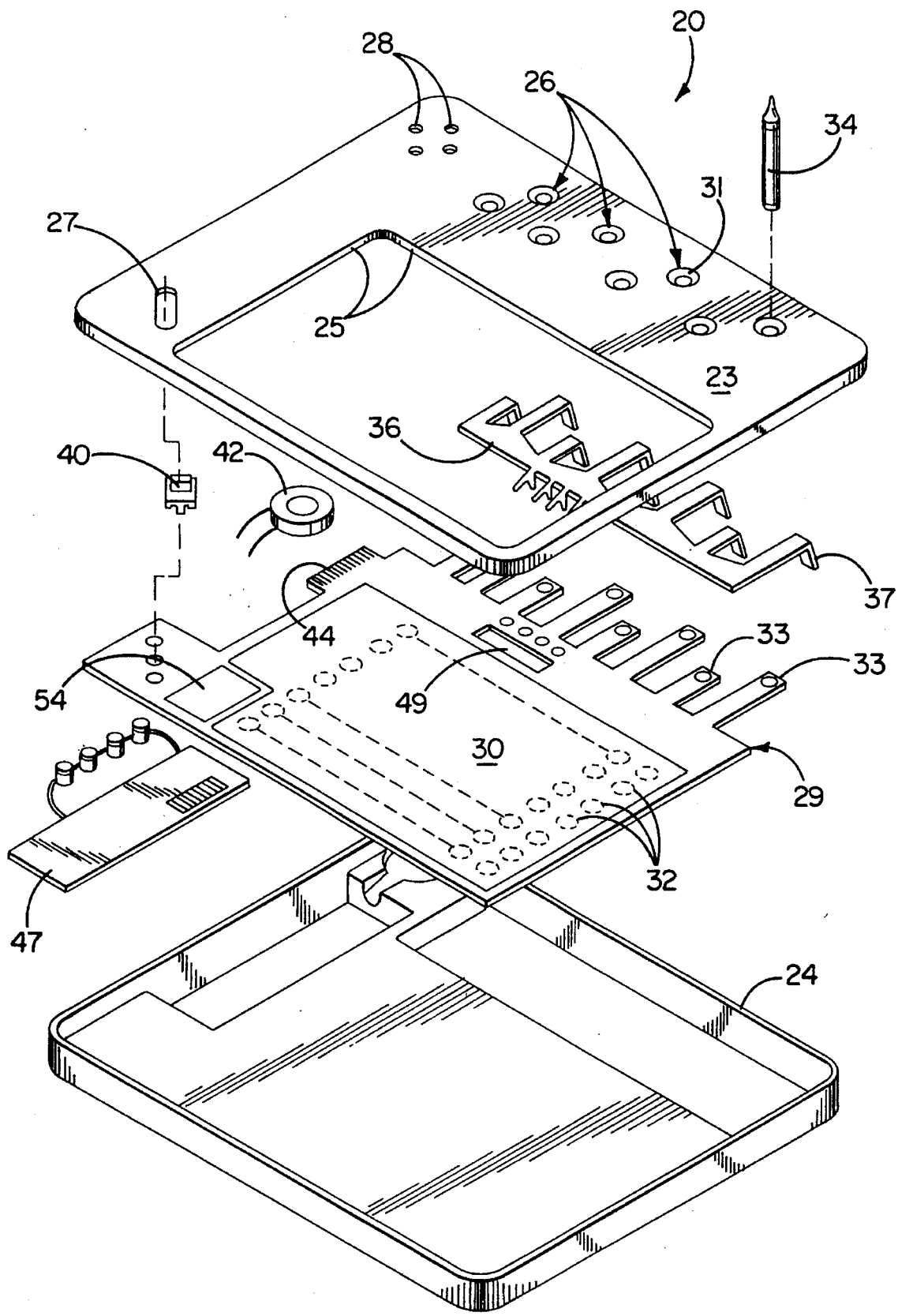
FIG. 2 is an exploded view of an electronic drawing device.

Referring now to FIGS. 1 and 2, an electronic drawing device is shown and generally designated as reference numeral 20. The drawing device 20 is generally defined by a rectangular-shaped frame 22, which is divided into upper frame portion 23 and lower 24 frame portion. The upper frame portion 23 is configured to provide a window 25 for exposing the drawing surface of a pressure sensitive drawing tablet 30, crayon holders 26, a switch path 27, and sound passages 28. The crayon holders 26 have color-coded chamfered edges 31 to facilitate proper color coordination and crayon placement within each individual crayon holder 26.

Sandwiched between the upper portion 23 and lower portion 24 of the frame is a substrate board 29. The pressure sensitive drawing tablet 30 substantially covers the surface of the substrate board 29 and comprises a matrix of individual membrane switches 32 or cells, which will be described in more detail in connection with FIG. 3, that close or short circuit as a result of pressure applied to the surface of the drawing tablet 30. In a preferred embodiment of the present invention, this pressure is applied by a drawing instrument 34 such as a crayon, marker, colored pencil, or the like. Extensions 33 of the substrate board 29 are provided as alignment stops for the individual drawing instruments 34. In connection with these extensions 33, a crayon detector 36 is also provided. Specifically, the crayon detector 36 includes individual resilient fingers 37 which are adapted to detect the presence of individual crayons 34 within their respective holders 26. The operation of the resilient fingers will be discussed in greater detail in connection with FIGS. 4a–4c.

A multi-position slide switch 40 is included to provide greater versatility and user control of various features of the present invention, as will be described in greater detail below. A speaker 42 is also included and is utilized to provide a variety of audible feedback or stimulation to a user, including melody and speech sounds. In one embodiment the speaker 42 is housed within the cartridge 46, while in another embodiment it is mounted within the frame 22 of the drawing device 20.

In a preferred embodiment of the present invention an edge connector 44 is located on the edge of the substrate board 29 to facilitate ready attachment of the substrate board 29 with a corresponding connector 45 of an external cartridge 46 (See FIG. 1.). In this way, the present invention is readily adapted to employ a variety of functional embodiments which can be user selected simply by attaching a different cartridge 46. It can be appreciated that in such an embodiment, a circuit board having all necessary electronic components is entirely self contained within the cartridge 46. In yet another embodiment, as shown in FIG. 2, the electronic drawing device of the present invention could be adapted as a stand alone device. In this embodiment, a circuit board 47 is included for direct connection to the connector 44. Indeed, in this embodiment the connector 44 could be eliminated, whereby the electronic circuitry and components would be contained on the substrate board 29.

In keeping with the present invention, a drawing sheet detector/encoder 49 is also disposed upon the substrate board 29. Individual drawing sheets 50 (as shown in FIG. 1) are uniquely identified by a series of identifier holes 51 disposed along the edge of the drawing sheet 50. That is, identifier holes 51 varying in number and spacing are spaced so as to align with the detector/encoder 49 in a particular fashion that is unique to each individual drawing sheet 50. It should be appreciated, in connection with alternative embodiments of the present invention, that alternative drawing sheet identifying means could be employed with equal success. For example, rather than having identifier holes 51, individual drawing sheets 50 may be magnetically encoded. Similarly, drawing sheets 50 could be identified photoelectronically by utilizing a bar coding indicia or the like on the edge of the drawing sheets 50. Drawing sheets 50 may be further encoded by disposing traces of conductive ink on the drawing sheets 50 such that, when the drawing sheets 50 are in place, the conductive traces align with open-circuit electrical contacts, closing the electrical circuit between the contacts.

Referring to FIG. 1, the drawing sheets 50 are inserted through a receiving slot 52 located along the edge of frame 22, and properly positioned so as to overlay the pressure sensitive drawing tablet 30. In one embodiment, the drawing sheets 50 are fabricated from material, such as paper coated with varnish, that is adapted for repeated use. That is, the drawing sheets 50 in this embodiment are made from material that can be easily erased, thereby allowing the same sheet to be used over and over. In an alternative embodiment, however, noneraseable or disposable drawing sheets are utilized to realize a cost savings over coated drawing sheets 50.

In yet another preferred embodiment, the drawing sheets 50 contain preprinted designs on both sides, achieving a more cost-effective design. In this embodiment, the drawing sheets 50 are correspondingly encoded so that both sides of the sheet 50 are distinguishable by the drawing sheet detector/encoder 49.

In yet a further embodiment, the drawing device 20 is adapted for drawing or coloring directly upon the tablet 30. In this embodiment, the surface of the tablet 30 is adapted for erasure by, for example, a varnish coating. It should be appreciated that, in connection with this embodiment, certain elements of the device 20 can be eliminated for cost-savings purposes. Included within this list of elements is the drawing sheet detector/encoder 49.

As shown in FIG. 2, a separate square is shown in the lower left hand corner of the drawing tablet 30. This separated square represents a unique pressure sensitive theme switch 54 that is provided to enhance the functionality of certain features of the present invention, as will be discussed in more detail below.

Figure 3A:
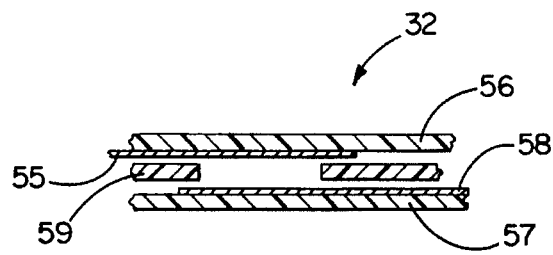
FIG. 3a is a cut-away side view of an individual membrane switch or cell of the pressure sensitive drawing tablet, shown in its open position.
Figure 3B:
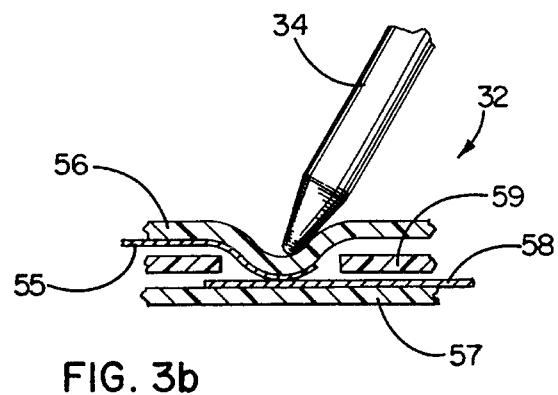
FIG. 3b is a cut-away side view of the membrane switch shown in FIG. 3a, showing the switch in its closed position due to force exerted from a drawing instrument.

Referring now to FIGS. 3a and 3b, an individual pressure sensitive membrane switch 32 is shown in both its open (FIG. 3a) and closed (FIG. 3b) positions. More specifically, in a preferred embodiment of the present invention, the pressure sensitive drawing tablet 30 is formed from a three layer substrate, wherein the individual membrane switches 32 are formed by traces 55 and 58 of conductive ink printed on the lower side of the upper substrate layer 56 and the upper side of the lower substrate layer 57. The conductive traces 55 and 58 are generally insulated from each other by a center substrate layer 59. The center layer 59, however, is punched in various locations so as to provide an air gap between the conductive traces 55 and 58. The substrates, and in particular the upper substrate layer 56, are fabricated from a resilient material that is deformed by pressure contact. As shown in FIG. 3b, when pressure is exerted from a stylus, or drawing instrument 34 at a location where the center layer has been punched, the upper layer 56 deflects into the lower layer 57, thereby electrically connecting the conductive traces 55 and 58 provided on the upper and lower substrates. When pressure from the drawing instrument 34 is removed, the upper substrate layer retracts to its normal position, thereby breaking the electrical contact between the conductive traces 55 and 58.

Referring now collectively to FIGS. 4a–4c, the crayon holder 26 and detector 36 are shown in greater detail. Specifically, the upper frame portion 23 immediately surrounding an individual crayon holder 26 is shown. Each crayon guide 31 is disposed directly above a chute 64 formed with an integral lobe 73. A finger 37 extending from and forming a part of the crayon detector 36 is disposed alongslide the lobe 73. As shown in FIG. 4b, when the crayon 34 has been removed from the crayon holder 26, the lobe 73 is adapted to protrude into the path of a crayon 34 to be inserted. Upon insertion of a crayon 34 into the chute 64 (FIG. 4c), the lobe 73 is forced to deflect away from the path of the inserted crayon 34 and into the finger 37.

A three-layer pressure sensitive membrane 62, of the type described for use with the drawing tablet 30, is disposed upon the surface of each finger 37. A cell or switch 63, of the same type as shown and described in FIGS. 3a and 3b, is provided upon finger 37 at the location adapted to receive pressure contact with the lobe 73, upon insertion of a crayon 34. It should be appreciated that the pressure contact formed at this location upon insertion of a crayon 34 is sufficient to close the switch 63. In this way (e.g., detecting whether switch 63 is open or closed), the present invention can determine whether a crayon 34 is inserted or withdrawn from the holder formed by crayon guides 26.

Consistent with the concepts and teachings of the present invention, it should be appreciated that alternative means of detecting the presence of a crayon 34 within the holder 26 can be employed with equal success. For example, a simple photoelectric emitter-detector pair could be disposed across the path of an inserted crayon for detecting crayon presence within the holder. Furthermore, more elaborate embodiments could include means, such as color sensors, for detecting the color of crayons 34 inserted in each holder 26, whereby no particular crayon placement need by made.

Referring now to FIGS. 5a–5d, a detailed view of the drawing sheet detector/encoder 49 is shown. In a preferred embodiment of the present invention, a mechanical detector/encoder 49 is provided and comprises primarily four-spring loaded arms 64 (only one shown in FIGS. 5a–5d). Each spring-loaded arm 64 includes two lobes: a contact lobe 65 and a sheet detector lobe 66. Normally the sheet detector lobe 66 of the encoder arm 64 extends into a reader pit 67 (see FIG. 5b). In this position, contact lobe 65 is in contact with a membrane switch 68 of a type previously described. The spring load on the encoder arm 64 is sufficient to cause enough force at the contact lobe 65 to deflect the membrane, so as to electrically close the membrane switch.

Figure 5A:
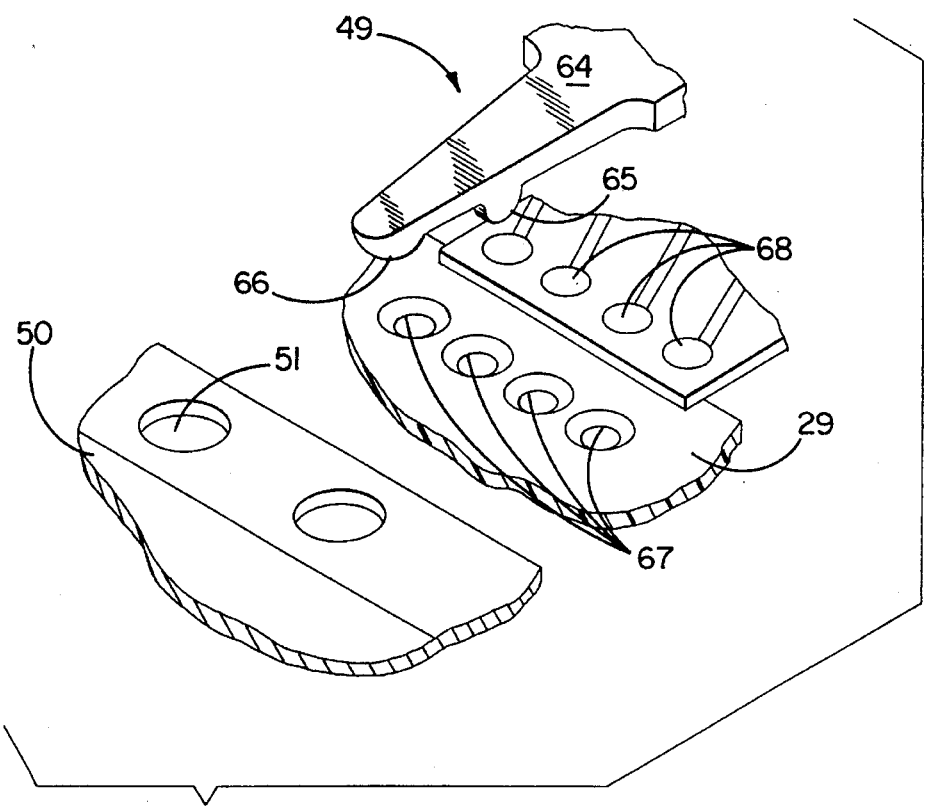
FIG. 5a is a cut-away exploded perspective view of the encoder portion for identifying various drawing sheets.
Figure 5B:
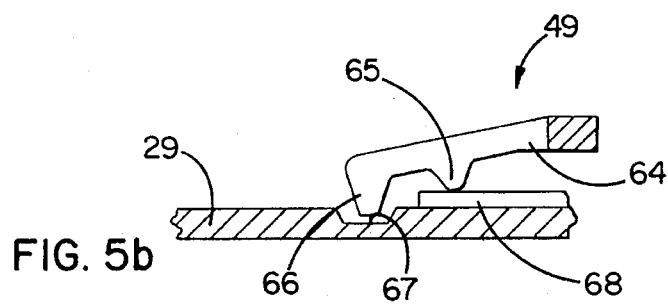
FIG. 5b is a cut-away side view of the encoder of FIG. 5a with no drawing sheet inserted.
Figure 5C:
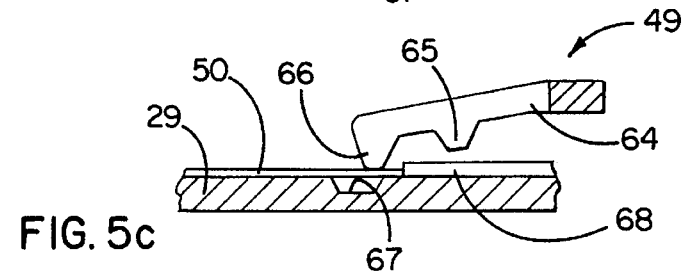
FIG. 5c is a cut-away side view of the encoder shown in FIG. 5a showing a drawing sheet inserted, but no registration of the identification hole.
Figure 5D:
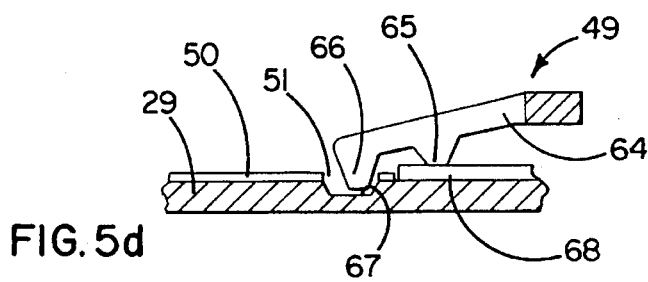
FIG. 5d is a cut-away side view of the encoder shown in FIG. 5a, having a drawing sheet inserted and showing registration or alignment with an identification hole.

As shown in FIG. 5c, when a drawing sheet 50 is inserted into the drawing device 20 the identifier holes 51 are disposed so as to align with the reader pits 67. In the particular example as illustrated in FIG. 5a, where the drawing sheet 50 has only two identifier holes 51, it should be appreciated that these holes will align with only two of the reader pits 67. FIG. 5c illustrates the displacement of the encoder arm 64 at reader locations where alignment does not occur. Specifically, as the drawing sheet 50 is slid into position, sheet detector lobe 66 is elevated from the reader pit 67 and is forced to ride along the surface of the drawing sheet 50. Accordingly, contact lobe 65 disengages from its pressure contact with the membrane switch 68 so as to open or break the electrical connection formed thereby. Where, however, as shown in FIG. 5d, an identifier hole 51 aligns with a reader pit 67, the contact lobe 65 of the encoder arm 64 again contacts and depresses the membrane switch 68 so as to close the electrical connection of that particular switch.

It should be appreciated that, in the preferred embodiment disclosed in FIGS. 5a–5d and described above, by using four individual encoder arms 64, there are sixteen unique binary codes that can be established by the various open or closed positions of the four encoder arms 64. It is assumed, however, that when all encoder arms 64 are in their closed position that no drawing sheet 50 has been inserted into the drawing device 20. It is likewise assumed that, when all encoder arms 64 are in their open position, a drawing sheet 50 has been improperly inserted or that an invalid drawing sheet 50 has been inserted into the drawing device 20. Accordingly, there remain fourteen valid binary codes for identifying various unique drawing sheets 50. It should be further appreciated, however, that this number can be greatly increased by the addition of further encoder arms 64 in connection with the necessary support structure for their operation.

Figure 6:
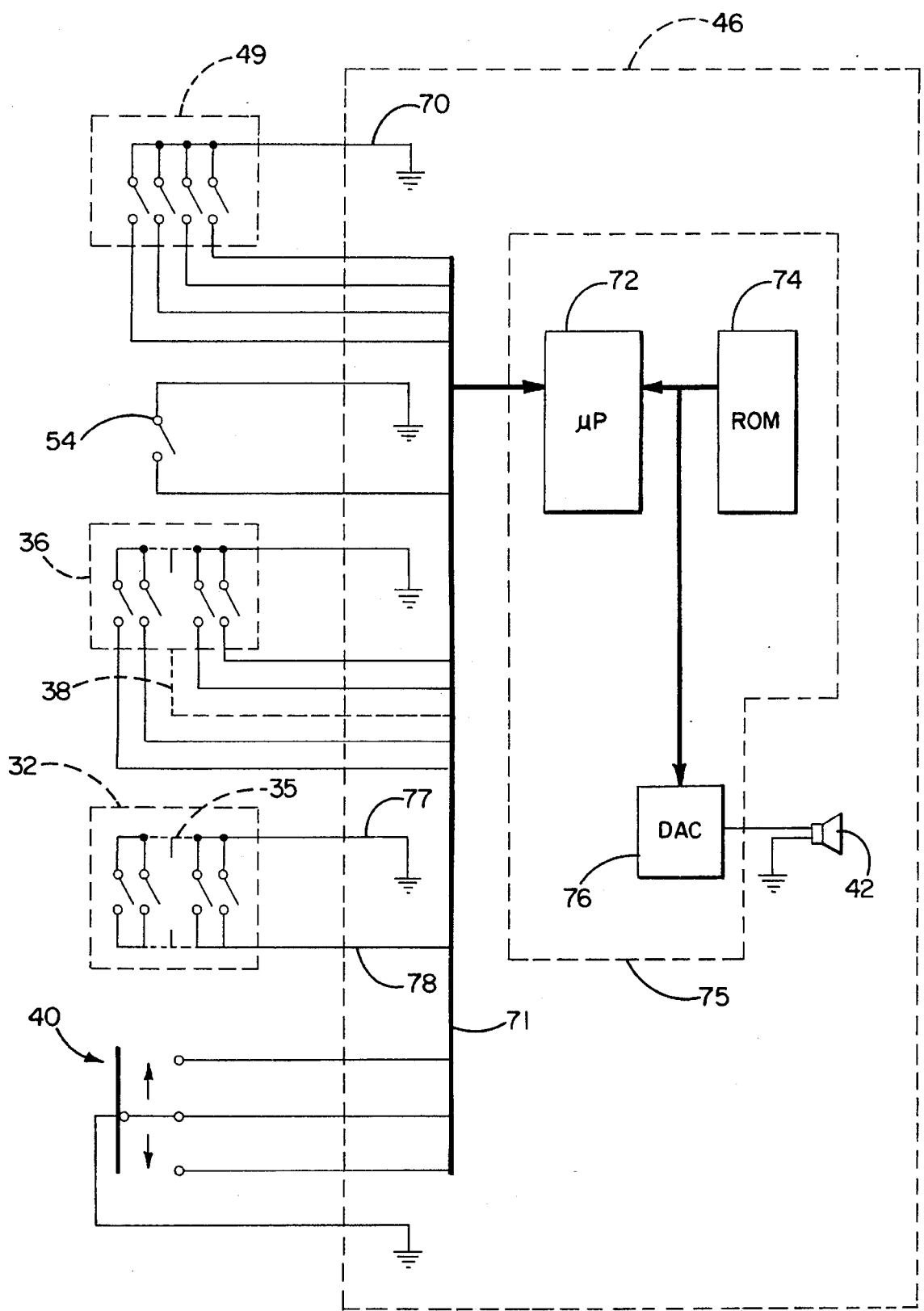
FIG. 6 is schematic diagram depicting the electronic circuitry of a preferred embodiment of the present invention.

FIG. 6 shows a schematic diagram of the circuitry of a preferred embodiment of the present invention. The various switches discussed earlier are represented schematically in FIG. 6. In particular, the membrane switches that comprise the drawing sheet detector/encoder 49 are enclosed in dashed lines in FIG. 6 and appropriately designated as reference numeral 49. Similarly the theme switch 54, drawing tablet membrane switches 32, crayon detector switches 36, and slide switch 40 are also shown. Dashed lines 46 represent the cartridge (discussed in connection with FIG. 1) in connection with a particular preferred embodiment of the present invention.

Additional dashed lines 38 and 35 are shown in connection with crayon detector switches 36 and drawing tablet membrane switches 32. These dashed lines are intended to illustrate that not all of the membrane switches have been shown in the figure. In a preferred embodiment of the present invention, there are eight crayon detector switches, whereas only four are shown in FIG. 6. Also, in the preferred embodiment, there are 225 drawing tablet membrane switches 32 comprising the switch matrix previously described, whereas only four are illustrated in FIG. 6.

As will be illustrated by particular reference to the switch grouping for the drawing sheet encoder/detector 49, each switch grouping has a common signal line (reference numeral 70 for the encoder/detector 49 switch grouping), electrically connecting each individual switch of that grouping to ground. The opposing or remaining switch contacts are electrically connected to a bus 71 that is accessible by a microprocessor 72. Although not shown in the figures, a pullup resistor is attached to each, non-common, switch signal line. Accordingly, when any given switch is in its open state, the associated non-common signal line will be in a "high" or logic 1 state. Conversely, when a given switch is in its closed state, the associated non-common signal line will be in a "grounded" or logic 0 state.

Also not shown in the figures, but as will be appreciated by one of ordinary skill in the art, latches or other buffer devices are provided between the bus 71 and microprocessor 72, whereby the state of the non-common signal lines can be read by the microprocessor 72 by addressing the particular latch associated with those lines. For example, the eight signal lines associated with the crayon detector switches 36 can be fed into a single latch which, in turn, can be accessed by the microprocessor 72 as a single byte of data. By examining the binary value of this data byte, the particular open-closed switch configuration for the crayon detector switches 36 can be determined. Furthermore, detection of a given switch transitioning from a closed to open state, indicates that a crayon has been withdrawn from that particular holder 26.

As will become clear from the discussion below, the switches form the input data for the microprocessor 72. The software that governs the operation of the microprocessor is responsive to particular switch configurations as well as various switch transitions.

In keeping with the invention, the microprocessor 72 is also in communication with a Read-Only Memory (ROM) 74 and a Digital to Analog Convertor (DAC) 76, the three devices collectively comprising an electronic computer 75. Sound data, including both speech and melody, is preprogrammed into the ROM 74. This data can be directed by the microprocessor 72 in a controlled fashion for output from the ROM 74 to the DAC 76, where it is converted into analog form and output to a speaker 42.

More particularly, various speech phrases and melodies may be audibly input into a microphone, the output signal of which may then be sampled, digitized, and stored in the ROM 74. By knowing, for example, where a particular phrase is addressed within the ROM 74 and further knowing how many bytes comprise that particular phrase, the microprocessor 72 can access that phrase and transmit it to the DAC 76 for output to the speaker 42.

In another preferred embodiment of the present invention, specialized support chips are used to create the speech and melody effects, rather than the preprogrammed ROM 74 described above. In one embodiment of the present invention, the electronic support circuitry comprises two specialized support chips: a voice synthesis chip and a melody chip. The particular support chips selected for use in this embodiment are manufactured by Vitelic Ltd., and can be specifically referenced by their part numbers MSS2801 (voice synthesis chip) and VM2188 (melody chip). The manufacturer's data sheets on these particular components can be referenced for a more complete and particular description of their operation, sufficient to enable one of ordinary skill in the art to configure them in a manner to effectuate the concepts and teachings of the present invention as disclosed herein.

In keeping with the present invention as disclosed in FIG. 6, the drawing template membrane switches 32 are electrically connected in parallel, wherein the switch grouping has two signal lines: a grounded or common line 77, and an active signal line 78. As previously described, pressure exerted from a drawing instrument 34 upon the drawing tablet 30 at a location coincident with a tablet membrane switch 32 will close that particular switch, causing the active signal line 78 to transition from its high to low state. It should be understood that as a user draws or colors upon a drawing sheet 50, the user will be moving the drawing instrument 34 across the tablet 30 so as to intermittently coincide with tablet membrane switch 32 locations. As a result, the various tablet membrane switches 32 will open and close in response thereto, causing the active signal line 78 to repeatedly transition between high and low states. The frequency of these state transitions on signal line 78 is proportional to the speed or rate at which the user is drawing or coloring.

In a preferred embodiment, the present invention is adapted to output different, preprogrammed melodies to the speaker 42, based upon the particular binary coding present at the drawing sheet detector 49. That is, the particular melody will be dependant upon the identity of the particular drawing sheet 50 inserted into the drawing device 20. In this embodiment, the particular preprogrammed melody begins to play at a predetermined tempo as soon as one of the tablet switches 32 closes. Furthermore, the computer 75 continues to monitor the high-low and low-high transitions occurring on the active signal line 78 from the tablet switches. As the frequency of these high-low and low-high transitions increases, the computer 75 causes the tempo of the melody to increase proportionally therewith.

Having described the low-level operation of the circuitry of a preferred embodiment of the present invention, reference will now be made to FIG. 7 which depicts the top-level operation of a preferred embodiment of the present invention. As is evident from the flow chart, the drawing sheet detector 49 is monitored and no action is taken unless a valid drawing sheet 50 has been inserted into the drawing device 20. Once a valid drawing sheet 50 has been inserted, then the action of the drawing device 20 depends upon whether the theme switch 54 is depressed or whether a crayon is used to draw on the tablet 30. If the theme switch 54 is depressed, a particular phrase is recited corresponding to the particular drawing sheet 50 that is inserted.

For example, a particular drawing sheet 50 may include the picture of sheep or lamb. Upon depression of the theme switch 54 in connection with the insertion of that particular drawing sheet, the present invention recites the nursery rhyme to "Mary Had A Little Lamb". A different drawing sheet may, similarly, depict a farm scene whereby depression of the theme switch 54 triggers the present invention to recite the lyrics to "The Farmer In The Dell".

If, instead of depressing the theme switch 54, a user were to select a crayon 34 for coloring upon the drawing surface, then the present invention plays the preprogrammed melody associated with the particular inserted drawing sheet 50. As in the example given above, if the drawing sheet contained a picture of a lamb, the device plays the melody associated with "Mary Had A Little Lamb", as the user colors upon the drawing sheet. Moreover, in connection with another aspect of the present invention, as the user varies the coloring speed, the tempo of the melody varies in proportion thereto.

Figure 8:
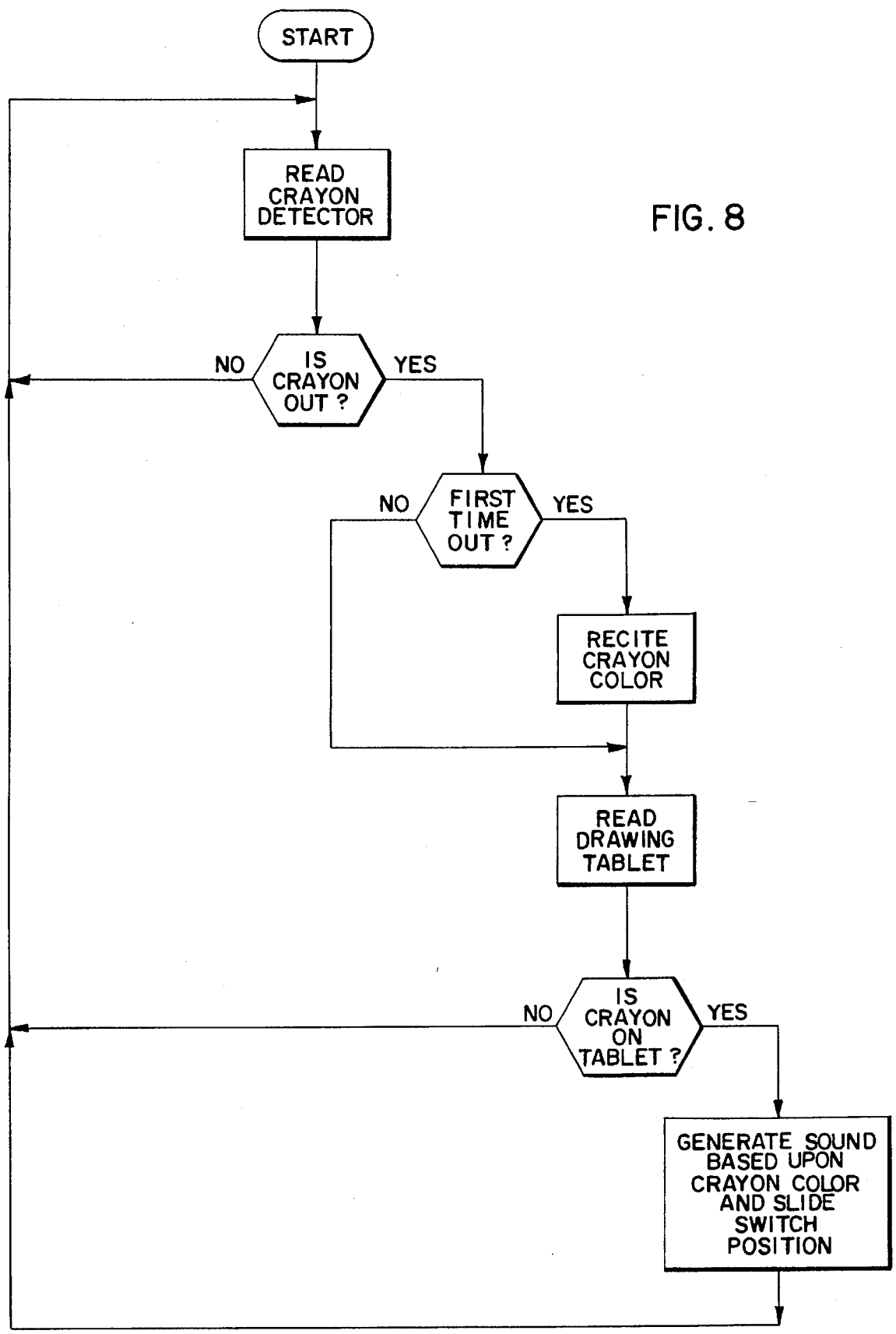
FIG. 8 is a flow chart depicting the software organization and operation for an alternative embodiment of the present invention.

Referring now to FIG. 8, an alternative embodiment of the present invention is shown. In this embodiment, the drawing sheet detector 49 is not monitored, so the identity of the particular drawing sheet 50 is irrelevant. Instead, this embodiment is directed toward developing or enhancing color identification or recognition. This objective is achieved by associating certain predetermined sounds with the various crayons, so that each individual crayon 34 has a unique sound associated with it. For example, the red crayon may be associated with the sound of a horn, while the blue crayon may be associated with the sound of a whistle.

In this embodiment, the computer 75 monitors the crayon detector 36 and slide switch 40. The slide switch 40 is adapted to selectably alter the predetermined sounds associated with the individual crayons. Indeed, in one embodiment there are three sets of predetermined sounds associated with the crayons. In one instance, as described above, the red and blue crayons may be associated with the sounds of a horn and whistle, respectively, when the switch 40 is in a first position. When the slide switch 40 is in a second position, these sounds may, for example, change to bell and a siren, or a bark and a meow, etc. Thus, the particular position of the slide switch 40 determines the set of predetermined sounds that are associated with the individual crayons.

In continuing with the description of FIG. 8, if the computer 75 detects that a crayon 34 has been withdrawn from the holder 26, then it causes the speaker 42 to recite the color of the crayon by, for example, stating "You picked the red crayon." The computer 75 then monitors the drawing tablet 30, and more specifically, the tablet switches 32. Upon detecting closure of any of these switches, and thus writing pressure upon the tablet 30, the computer 75 causes the speaker 42 to play the sound associated with the particular crayon selected in combination with the position of the slide switch 40.

Figure 9:
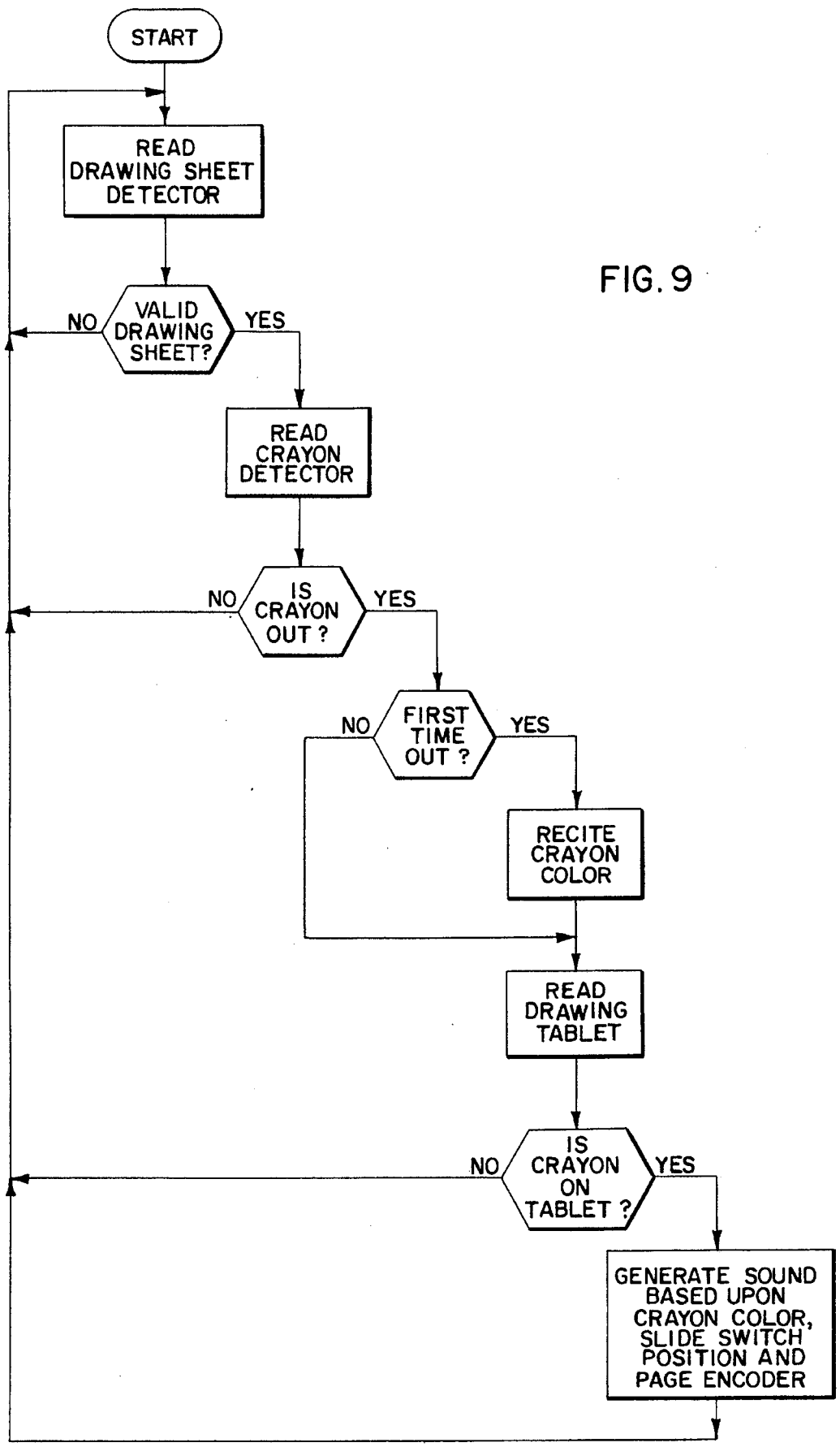
FIG. 9 is a flow chart depicting the software organization and operation for an alternative embodiment of the present invention.

Referring now to FIG. 9, yet another embodiment of the present invention is shown. This embodiment effectively combines the features of the embodiments discussed in connections with FIGS. 7 and 8. More specifically, it retains the features of the function or slide switch 40, while coupling the predetermined sound "sets" with preprinted graphics on the drawing sheets 50. For example, one drawing sheet may contain pictures of various animals. The sounds, then, associated with the various crayons when that particular drawing sheet is inserted are different animal sounds, such as barking, mooing, tweeting, etc. Moreover, as the function or slide switch 40 is switched to a different position, different animal sounds become associated with the different crayons.

As another example, suppose the drawing sheet 50 contains a picture of cars and buildings in a heavily urbanized area. The sounds associated with the various crayons when this particular drawing sheet is inserted may be car horns, engines, whistles, or other similar noises associated with such a scenic backdrop. Furthermore, the various sounds may be selectively changed by movement of the slide switch 40.

In connection with the description relating to both FIGS. 8 and 9, another preferred embodiment utilizes a slide switch 40 having an additional position; for example, a four-position, rather than three-position (as shown in FIG. 6), slide switch 40. In this embodiment, no sound is output when a crayon 34 is withdrawn from a holder 26. Rather, an individual switch position is provided to instruct the device to recite the crayon color, only as pressure contact is exerted from the crayon 34 upon the tablet 30. The remaining switch positions function in the way previously described. Furthermore, since the embodiments described in relation to FIGS. 8 and 9 are concerned only with pressure contact made with the drawing tablet 30, and not the rate of movement of the drawing instrument 34 across the tablet 30, the drawing tablet 30 may be configured to have only a single switch, rather than an entire matrix of switches. In this way, pressure contact exerted by the drawing instrument 34 on any portion of the drawing tablet 30 closes the single switch.

Figure 7:
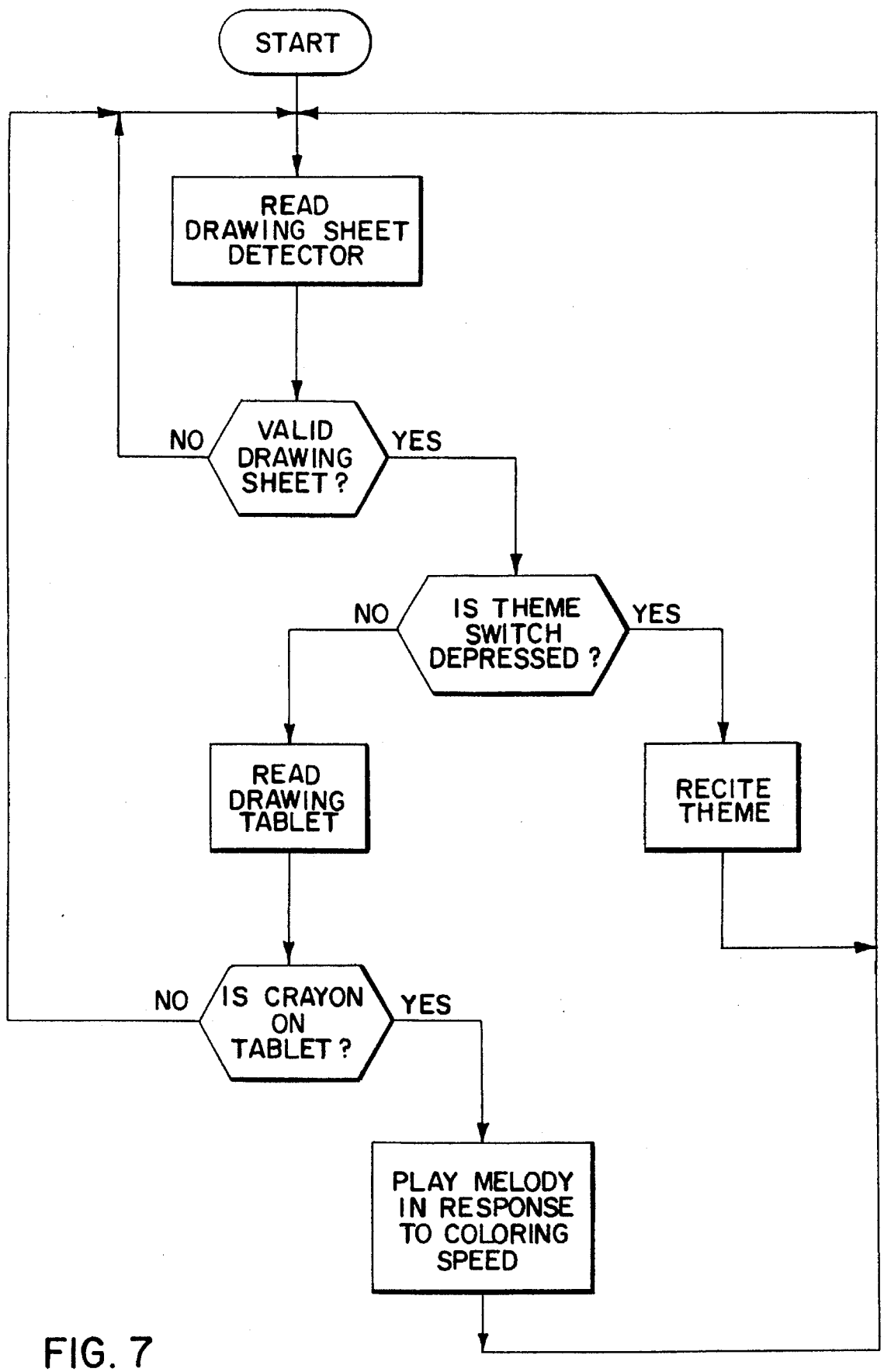
FIG. 7 is a flow chart depicting the software organization and operation for a preferred embodiment of the present invention.

It can be appreciated that a user may select between the different operating embodiments discussed in FIGS. 7–9, or other embodiments consistent with the teachings of the present invention, by simply interchanging different cartridges 46 into the device 20. Moreover, by providing a wide variety of differing scenes upon different drawing sheets, as well as providing different interactive modes of operation for creating a wide variety of sound effects, the present invention effectively fosters a child's fascination or interest in coloring and drawing.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An interactive drawing device for use with a drawing instrument, the interactive drawing device comprising:
   a housing;

a drawing tablet disposed in the housing and having a drawing surface, the drawing tablet being adapted to generate a series of electrical pulses in response to a drawing instrument moving across its drawing surface, the frequency with which the electrical pulses occur being substantially proportional to the speed of the moving drawing instrument, the individual electrical pulses of the series being substantially the same regardless of the position of the drawing instrument when the drawing instrument moves across the drawing surface at a constant speed;

a sound generating computer electrically connected to the drawing tablet for receiving the electrical pulses generated by the translation of the drawing instrument across the drawing surface of the drawing tablet and for generating output signals in response thereto; and an audible device connected to the sound generating computer for receiving the output signals and for converting the output signals into an audible output, the tempo of the audible output corresponding to the frequency at which the electrical pulses generated by the drawing tablet occur.

2. The drawing device according to claim 1, wherein the drawing tablet is adapted to receive a drawing sheet that is attached to overlay at least a portion of the drawing tablet.

3. The drawing device according to claim 2, further including a decoder connected to the sound generating computer, wherein the drawing sheet is coded, the decoder decodes the drawing sheet, and the decoder generates a decoder signal that identifies the drawing sheet.

4. The drawing device according to claim 3, wherein the decoder signal causes the sound generating computer to generate predetermined output signals corresponding to predetermined sounds associated with the drawing sheet when the drawing tablet generates electrical pulses.

5. The drawing device according to claim 1, wherein the drawing surface of the drawing tablet is an erasable surface thereby allowing repeated use of the drawing tablet.

6. The drawing device according to claim 2, wherein the drawing sheet includes an erasable surface allowing repeated use of the drawing sheet.

7. The drawing device according to claim 2, wherein the drawing sheet is nonerasable.

8. The drawing device according to claim 1, wherein the drawing tablet is pressure sensitive and includes a matrix of switches for detecting pressure contact from the drawing instrument.

9. The drawing device according to claim 4, wherein the drawing tablet includes at least one theme switch having an active and an inactive position.

10. The drawing device according to claim 1, further including at least one theme switch having an active and an inactive position.

11. The drawing device according to claim 9, wherein the drawing tablet generates a theme switch signal which is indicative of the position of the theme switch.

12. The drawing device according to claim 11, wherein the output signals generated by the sound generating computer in response to the theme switch signal causes the audible output of the audible device to be a predetermined audible sequence when the theme switch enters its active position.

13. The drawing device according to claim 12, wherein the predetermined audible sequence is dependent upon the identity of the drawing sheet as indicated by the decoder signal.

14. The drawing device according to claim 12, wherein the audible sequence is a series of words.

15. The drawing device according to claim 12, wherein the audible sequence is a melody.

16. The drawing device according to claim 3, wherein the output signals generated by the sound generating computer causes the audible output of the audible device to be a predetermined audible sequence when the drawing tablet detects the presence of the drawing instrument.

17. The drawing device according to claim 16, wherein the predetermined audible sequence is dependent upon the identity of the drawing sheet.

18. The drawing device according to claim 17, wherein the drawing tablet is pressure sensitive and includes a matrix of switches for detecting pressure contact from the drawing instrument.

19. The drawing device according to claim 18, wherein the tempo of the predetermined audible sequence varies in proportion to the rate at which individual switches of the matrix of switches open and close in response to pressure contact from the drawing instrument.

20. The drawing device according to claim 1, wherein the output signals generated by the sound generating computer causes the audible output of the audible device to be a predetermined audible sequence when the drawing tablet detects the presence of the drawing instrument.

21. The drawing device according to claim 20, wherein the drawing tablet is pressure sensitive and includes a matrix of switches for detecting pressure contact from the drawing instrument.

22. The drawing device according to claim 21, wherein the frequency of the electrical pulses is proportional to the rate at which individual switches of the matrix of switches open and close in response to pressure contact from the drawing instrument.

23. The drawing device according to claim 1, further comprising a drawing instrument detector, the drawing instrument detector including a holder for holding the drawing instrument.

24. The drawing device according to claim 23, further comprising a second holder and a second drawing instrument, wherein the drawing instrument detector is adapted to detect whether each of the two drawing instruments is disposed in its respective holder.

25. The drawing device according to claim 24, wherein each of the two drawing instruments has an associated color.

26. The drawing device according to claim 24, wherein the drawing instrument detector generates an instrument output signal which is indicative of whether the drawing instruments are within their respective holders.

27. The drawing device according to claim 26, wherein the instrument output signal changes upon removal of one of the drawing instruments from its respective holder.

28. The drawing device according to claim 27, wherein the sound generating computer causes the audible output of the audible device to be a predetermined audible sequence upon detecting a change in the instrument output signal indicative of the removal of one of the drawing instruments from its respective holder.

29. The drawing device according to claim 28, wherein the predetermined audible sequence is a series of words identifying the color of the drawing instrument removed from its respective holder.

30. The drawing device according to claim 17, wherein the predetermined audible sequence is dependent upon the identity of the drawing instrument.

31. The drawing device according to claim 16, further comprising a multi-position function switch.

32. The drawing device according to claim 31, wherein the output signals generated by the sound generating computer are dependent upon the position of the function switch.

33. The drawing device according to claim 32, wherein the output signals generated by the sound generating computer are also dependent upon the identity of the drawing instrument.

34. The drawing device according to claim 33, wherein the output signals generated by the sound generating computer are also dependent upon the identity of the drawing sheet.

35. The drawing device according to claim 1, further comprising a cartridge adapted for connection to a connector of the drawing device.

36. The drawing device according to claim 35, wherein a portion of the sound generating computer is housed in the cartridge, and is adapted for electrical communication with the drawing tablet, the drawing instrument detector, and the audible device through the connector.

37. The drawing device according to claim 35, wherein the sound generating computer includes a programmable device capable of storing instructions for directing operation of the device.

38. The drawing device according to claim 36, wherein a plurality of cartridges are provided, each of the cartridges having a programmable device containing a unique set of instructions whereby particular operations of the device are effectuated by connection of a particular cartridge to the connector.

39. An interactive drawing device providing audible stimuli for providing drawing and coloring entertainment comprising:
- at least one drawing instrument;
- a drawing instrument detector for indicating the identity of the drawing instrument;
- a pressure sensitive drawing tablet that is responsive to pressure contact from the drawing instrument;
- at least one drawing sheet having an identifier for uniquely identifying the drawing sheet;
- a computer adapted to monitor the drawing instrument detector, the drawing tablet, and the drawing sheet identifier, said computer being electrically connected to an audible device, wherein the computer controls the output of the audible device based upon the state of the drawing instrument detector, the drawing tablet, and the drawing sheet identifier.

40. An interactive drawing device for use with at least one drawing instrument and having an audible output for encouraging drawing and coloring activity, the drawing device comprising:
- a pressure sensitive drawing surface;
- at least one drawing sheet, the drawing sheet encoded for unique identification;
- an encoder that generates an output signal indicative of the identity of the drawing sheet;
- an audible device; and
- an electronic computer in electrical communication with the drawing surface, the encoder, and the audible device, the computer being programmed to control the audible device so as to vary its output in response the combination of pressure applied to the drawing surface and the output signal of the encoder.

41. The drawing device according to claim 40, further including a plurality of drawing instrument detectors in electrical communication with the computer, each drawing instrument detector having an output representative of the identity of a drawing instrument.

42. The drawing device according to claim 41, wherein the computer is programmed to control the audible device so as to vary its output in response to the output of the drawing instrument detectors.

43. The drawing device according to claim 39, wherein the drawing instrument detector output signal is indicative of the color of the drawing instrument.

44. The drawing device according to claim 39, wherein the drawing instrument detector output signal is indicative of the position of the drawing instrument.

45. The drawing device according to claim 39, wherein the drawing tablet is adapted to receive a drawing sheet that is attached to overlay at least a portion of the drawing tablet.

46. The drawing device according to claim 45, further including a decoder in electrical communication with the computer, wherein the decoder generates an output signal that uniquely identifies the drawing sheet.

47. The drawing device according to claim 46, wherein the computer output signal is responsive to the operation of the combination of the drawing tablet output signal, the drawing instrument detector output signal, and the decoder output signal.

48. The drawing device according to claim 39, wherein the drawing tablet includes an erasable surface allowing repeated use of the drawing tablet.

49. The drawing device according to claim 39, wherein the drawing tablet includes a matrix of switches for detecting pressure contact from the drawing instrument.

50. The drawing device according to claim 39, wherein the drawing tablet includes a single switch for detecting pressure contact from the drawing instrument.

51. The drawing device according to claim 47, wherein the drawing tablet includes at least one theme switch having an active and inactive position.

52. The drawing device according to claim 39, wherein further including at least one theme switch having an active and an inactive position.

53. The drawing device according to claim 51, wherein the drawing tablet output signal is indicative of both pressure contact from the drawing instrument and the position of the theme switch.

54. The drawing device according to claim 53, wherein the computer output signal directs the audible device to sound a predetermined audible sequence when the theme switch enters its active position.

55. The drawing device according to claim 54, wherein the predetermined audible sequence is dependent upon the identity of the drawing sheet as indicated by the decoder output signal.

56. The drawing device according to claim 54, wherein the audible sequence is a series of words.

57. The drawing device according to claim 54, wherein the audible sequence is a melody.

58. The drawing device according to claim 39, wherein the drawing instrument detector includes a holder for the at least one drawing instrument.

59. The drawing device according to claim 58, wherein the detector is adapted to detect the presence of each drawing instrument.

60. The drawing device according to claim 59, further including a plurality of variously colored drawing instruments.

61. The drawing device according to claim 40, wherein the computer output directs the audible device to sound a predetermined audible sequence when the drawing tablet detects pressure from the drawing instrument.

62. The drawing device according to claim 40, wherein the computer output directs the audible device to sound a predetermined audible sequence when the drawing tablet detects pressure from the drawing instrument.

63. The drawing device according to claim 62, wherein the predetermined audible sequence varies according to the rate at which the drawing instrument moves across the drawing tablet.

64. The drawing device according to claim 63, wherein the tempo of the predetermined audible sequence varies in proportion to the rate at which the drawing instrument moves across the drawing tablet.

65. The drawing device according to claim 62, wherein the drawing tablet includes a matrix of switches for detecting pressure contact from the drawing instrument.

66. The drawing device according to claim 65, wherein the tempo of the predetermined audible sequence varies in proportion to the rate at which individual switches of the matrix of switches open and close in response to pressure contact from the drawing instrument.

67. The drawing device according to claim 61, further comprising a multi-position function switch.

68. The drawing device according to claim 67, wherein the computer output is dependent upon the position of the function switch.

69. The drawing device according to claim 68, wherein the computer output is dependent upon the identity of the drawing instrument.

70. The drawing device according to claim 69, wherein computer output is dependent upon the identity of the drawing sheet.

71. A drawing device comprising:

a housing;

a plurality of instrument holders disposed in the housing;

a plurality of drawing instruments, each of the instruments being associated with one of the instrument holders, and each of the instruments having an associated color;

an instrument detector associated with the plurality of instrument holders to detect the removal of the drawing instruments from the instrument holders, the instrument detector generating a predetermined instrument signal indicating which of the plurality of drawing instruments has been removed from its respective holder;

sound sourcing means for producing a plurality of sound signals;

processing means coupled to the instrument detector and to the sound sourcing means for receiving the predetermined instrument signal from the instrument detector and for selecting a sound signal from the sound sourcing means which corresponds to the predetermined instrument signal; and, sound generating means for converting the sound signal selected by the processing means to an audible sound, wherein the sound signal selected by the processing means corresponds to the drawing instrument removed from its respective holder.

72. A drawing device as defined in claim 71 wherein the sound signal selected by the processing means corresponds to the color of the drawing instrument removed from its respective holder.

73. A drawing device as defined in claim 71 wherein the sound sourcing means comprises an addressable memory.

74. A drawing device as defined in claim 71 wherein the sound sourcing means comprises a voice synthesis support chip.

75. A drawing device as defined in claim 71 wherein the sound sourcing means comprises a melody support chip.

76. An interactive drawing device for use with a drawing instrument, the interactive drawing device comprising:

a housing;

a pressure sensitive drawing tablet disposed in the housing and having a drawing surface, the drawing surface including a matrix of switches, the switches being resiliently closeable such that pressure exerted by a drawing instrument against the drawing surface will close adjacent ones of the switches which will re-open when the pressure exerted by the drawing instrument is removed, the switches of the matrix being electrically connected in parallel such that closing any one switch in the matrix is electrically the same as closing any other switch in the matrix, wherein closing any switch in the matrix generates an electrical pulse such that translating a drawing instrument across the drawing surface will generate a plurality of electrical pulses having a frequency proportional to the velocity of the drawing instrument;

a sound generating computer electrically connected to the matrix of switches for receiving the electrical pulses generated by the pressure exerted by the drawing instrument on the drawing surface of the pressure sensitive tablet and for generating output signals corresponding to sounds in response thereto; and an audible device connected to the sound generating computer for receiving the output signals and for converting the output signals into an audible output having a tempo corresponding to the frequency of the electrical pulses generated by the matrix of switches.

* * * * *